United States Patent

[11] 3,577,002

| [72] | Inventors | Samuel S. Hall;<br>Robert A. Miller; Philip R. H. Riley, Ilford,<br>Essex, England |
|---|---|---|
| [21] | Appl. No. | 816,710 |
| [22] | Filed | Apr. 16, 1969 |
| [45] | Patented | May 4, 1971 |
| [73] | Assignee | The Plessey Company Limited<br>Ilford, England |
| [32] | Priority | Apr. 19, 1968 |
| [33] | | Great Britain |
| [31] | | 18692/68 |

[54] MOTOR-GENERATOR COMBINATION
7 Claims, 1 Drawing Fig.

[52] U.S. Cl. .................................................. 290/46,
310/68, 310/113, 310/240
[51] Int. Cl. ...................................................... F02n 11/04
[50] Field of Search........................................... 310/243,
240, 167, 247, 68.4, 112—114, 136, 68; 290/38,
46

[56] References Cited
UNITED STATES PATENTS

| 2,377,260 | 5/1945 | Nardone...................... | 310/240 |
| 2,446,297 | 8/1948 | Nardone...................... | 310/246 |
| 3,034,035 | 5/1962 | Baumann et al. ............. | 310/68 |
| 3,041,484 | 6/1962 | Freer et al. ................... | 310/68.4 |

Primary Examiner—D. F. Duggan
Attorney—Blum, Moscovitz, Friedman & Kaplan

ABSTRACT: A compact unit for supplying an aircraft with both DC and AC electric power under normal running conditions and to provide also electric starting facilities, and which can be attached to a single engine pad of an aircraft turbine, is obtained by energizing the rotor field windings of an alternator with DC power via a rectifier system participating in its rotation from the armature windings of a coaxially arranged starter motor, which for the purpose has a second multiturn field winding, the starter motor having also automatic brush-lifting gear; the DC power output is obtained from a second stator winding of the alternator via a built-in rectifier set.

PATENTED MAY 4 1971                    3,577,002
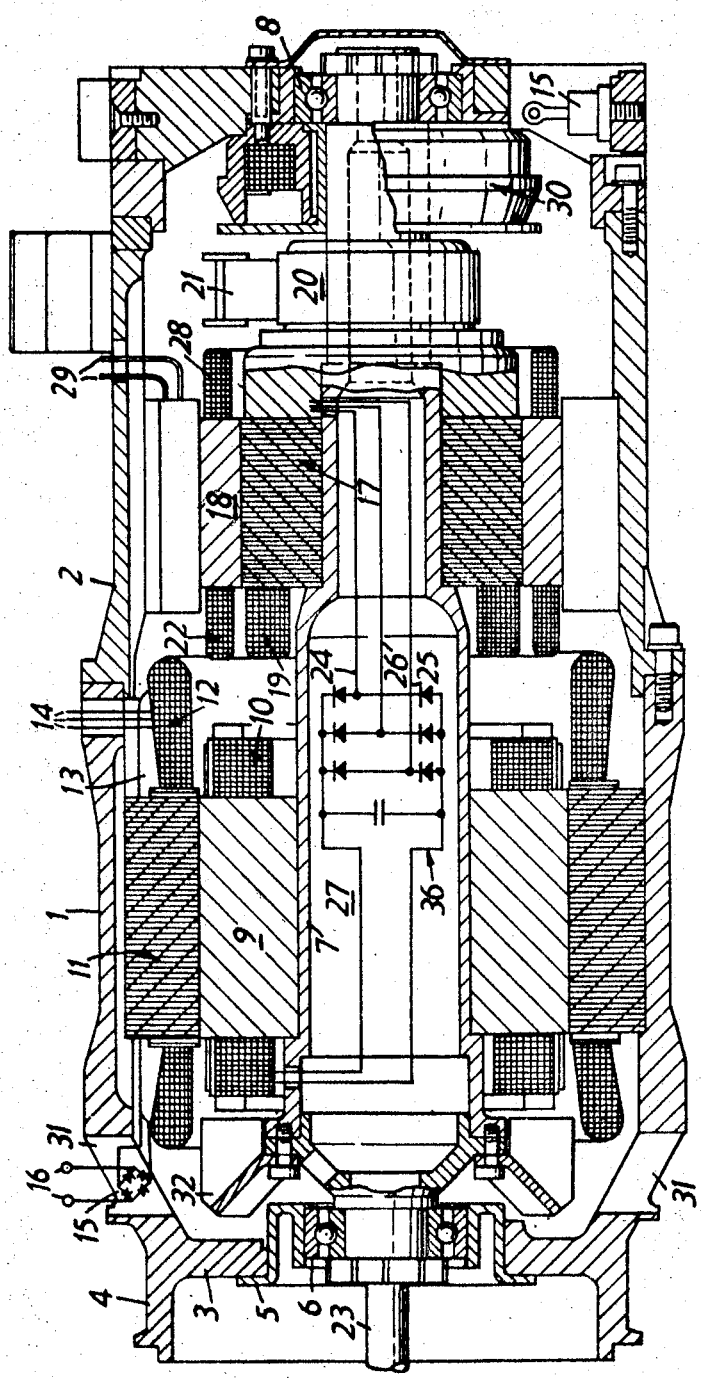

MOTOR-GENERATOR COMBINATION

This invention relates to electrical machines suitable for use as a motor for the production of mechanical power and for use as a generator for the generation of electricity. It has for an object to provide an improved electric motor generator adapted for use as a motor to start a combustion engine and, during the normal running of the combustion engine, for the generation of electric energy in the form of a DC output.

It is well known to provide, more particularly in conjunction with motorcycle or motorcar engines, a combined starter and generator by equipping a starter motor of conventional construction, in addition to the normal series-connected field winding, with a second field winding adapted to be energized either by the commutator voltage or from a separate source of voltage, this second field winding having a much greater number of turns than the series-connected motor-field winding so as to permit the maintenance of the generator field with a low current consumption. In this known arrangement one and the same commutator serves during starting for the passage of the heavy starting current through the armature winding, and during normal running of the engine it serves to convey the current output of the generator. This means that a commutator system which must be able to convey the heavy starting current, and which therefore must have a diameter and an axial length much greater than those of the commutator of a normal electric generator having comparable output, will remain operative throughout the running time of the engine with the result of excessive wear of the commutator and its brushes.

It is therefore a broad object of the present invention to provide a combined starter-generator which avoids the use of the heavy starting commutator for the conduction of the relatively light armature current flowing after completion of the starting operation.

According to the present invention an electric starter generator has an armature provided with two separate commutation systems, one including a commutator designed to carry the heavy starting current during use of the machine for starting an engine and combined with an automatic brush-lifting mechanism which lifts the brushes off the commutator when the starting operation has been completed, and the other reserved for the conveyance of the generator output during normal running of the engine.

According to a further development of the invention the motor-generator according to the above-stated broad aspect of the invention is connected for coaxial joint rotation with the rotor of an electric alternator, the output commutation system of its armature being constituted by a rectifier set participating in the rotation of the armature and feeding the DC output of the motor-generator direct to field windings in the rotor of the alternator.

If a supply of DC other than that for exciting the field windings of the alternator is additionally required, this can, according to a further feature of the invention, be achieved by providing the stator of the alternator with two outlets, one to an AC network, and a second outlet via an output-rectification diode system to an external DC load, the output-rectification diode system being conveniently accommodated in the stator of the alternator, so that the alternator in effect constitutes an alternator-generator. If the DC is required at a voltage different from that of the AC, the use of a separate transformer may be made unnecessary by providing the alternator-generator with two stator windings, either by providing two separate windings for supplying respectively the DC output and the AC output, or by the use of a single tapped winding.

It will be readily apparent that the invention makes available a machine capable of being constructed in an extremely compact form and providing, for example in an aircraft, not only a power-generation system capable of satisfying both the DC and AC power requirements of the aircraft but at the same time providing starting facilities, the machine having only two rotors and a single commutator, all capable of being mounted on a common shaft or on coaxially coupled shafts so that the whole machine can be attached to a single engine power-takeoff pad of an aircraft engine.

An electric machine incorporating one form of the present invention, which is adapted for attachment to a single power-takeoff pad or an aero engine to serve on the one hand to start the engine when required and on the other hand, during normal running of the engine, to supply AC electric power for the aircraft main electric system and simultaneously DC electric power for the supplementary DC system of the aircraft, will now be described with reference to the accompanying drawing, which shows the apparatus in a partly diagrammatic elevation, substantially in axial section.

Referring now to the drawing, the unit comprises a generally cylindrical housing formed of two shell members 1 and 2 secured to each other in coaxial alignment. One shell member 1 has an internal flange 3 and an end collar 4 adapted for attachment to, and centralization on, a power-takeoff pad of, for example, an aircraft gas turbine, such pad being hereinafter briefly referred to as engine pad. The flange 3 serves to support, through a resilient intermediate member 5, a ball bearing 6 which supports one end of a hollow shaft 7, and the other end of this shaft is supported through a second ball bearing 8 in the other housing shell member 2, which itself forms the continuation of the first-mentioned shell member 1. Fixed on the hollow shaft 7 is a rotor 9 equipped with field windings 10 for cooperation with a stator 11, which latter is secured in the said first-mentioned housing shell member 1 and is provided with two sets of stator windings 12 and 13, namely a first winding 12, which is connected to three terminals 14 from which an alternator output is available, and a second stator winding 13 which is connected, via a rectifier-diode arrangement 15, to a pair of DC output terminals 16 at which the equivalent of a DC generator output is available, and which may include smoothing means in a manner well known in the art. The voltage of this DC output may be choosen independently of the voltage of the AC output at terminals 14.

The shaft 7 further carries, within the other shell member 2 of the housing, an armature body 17 which rotates inside a stationary field system 18 secured in the said other shell member 2. The armature body 17 carries an armature winding 19, and this winding is series-connected, through a commutator 20 and brushes 21, of which only one is shown, with a series field winding 22 on the stationary field system 18, to form a starter motor whose torque is, through a short coupling stud 23, transmitted to the engine power-takeoff shaft of the pad to which the collar 4 is attached, and through this takeoff shaft to the engine itself.

When after starting the engine has become self-sustaining, power from the engine is transmitted by the coupling stud 23 to the hollow shaft 7, to turn both the rotor 9 of the alternator and the armature 17. The armature winding 19 is, in addition to its connection to the commutator 20, also connected by three leads 24, 25, 26 and a diode rectifier system 36, all accommodated in the cavity 27 of the shaft 7, to the field winding 10 of the alternator rotor 9 to produce the field for the generation of an output voltage in the stator windings 12 and 13, and in order to produce the necessary voltage in the armature winding 19 when no voltage is applied to the brushes 21, the field system 18 which cooperates with the armature 17 is equipped with a second multiturn winding 28 whose terminals 29 are under these conditions applied to a suitable DC voltage, which may be the voltage obtained from the DC terminals 16 or any other suitable voltage available, for example that of a storage battery in the DC consumer system.

It will be readily appreciated that, since the energization of the alternator field winding 10 is independent of both the commutator 20 and the brushes 21, the brushes 21 may be lifted off the commutator once the shaft 7 has reached a speed corresponding to the self-sustaining speed of the engine, and for this purpose the illustrated embodiment incorporates an electrically actuated brush-lifting device 30 which is arranged to lift the brushes automatically when, and as long as, the shaft 7 exceeds a predetermined minimum speed. The hollow construction of the shaft 7 not only provides the space necessary for accommodating the rectifier diode device 26 but also permits the shaft to be made sufficiently rigid to avoid the necessity of providing a third bearing between the unit 9, 11, which may be referred to as the alternator-generator, and the unit 17, 18, which may be correspondingly referred to as the starter-exciter, with the result that, although the machine described performs the functions of an alternator, of a DC generator, of a starter motor and of an exciter generator, its overall length can be kept relatively short and its overall diameter need not substantially exceed that of a conventional alternator adapted to be fitted to an engine pad of an aircraft turbine, so that a single engine pad is sufficient to provide not only both DC and AC electric power supply but also starting facilities for the engine.

In order to provide for effective cooling of the machine, the free end of the housing shell 2 is adapted for attachment to the air ducting of an aircraft, while air outlet openings 31 are provided in the shell 1 adjacent to the collar 4, and in order to assist the flow of air from the ducting, the hollow shaft 7 is equipped, in the vicinity of the exhaust openings 31, with a set of centrifugal exhauster-fan blading 32.

The control of the output voltage is normally effected by varying the field strength in the multiturn winding 28 of the field system 18 including the voltage applied to the rotor field windings of the alternator, this control being normally effected in response to the alternator output voltage. This will generally ensure a reasonable constant DC output voltage at the same time, more particularly when the DC system contains a storage or buffer battery, but if necessary a supplementary control of the DC output can be achieved by employing, in three of the four branches, or in all four branches, of the DC output rectifier bridge, controllable rectifiers such as those known as silicon-controlled rectifiers. In this manner the DC output of the generator may be reduced or even cut off when the storage battery is fully charged.

We claim:

1. An electric machine adapted to be driven by DC to produce torque for starting a combustion engine and, when driven by such engine, to produce an AC electric output, the machine comprising an electrical alternator having a stator, equipped with an alternator-output winding, and a rotor, equipped with an alternator-field winding, an electric motor-generator having a stator, equipped with a motor-field winding and with a generator-field winding, and an armature which is connected to the rotor of said alternator for joint rotation therewith, said armature having a heavy-current commutation system, including a commutator and brushes in series with said motor-field winding for the production of torque to start each engine, and having a second commutation system constituted by a rectifier set participating in the rotation of the armature and feeding DC generated by it direct to the alternator-field winding.

2. A machine as claimed in claim 1, wherein the alternator is provided with two outlets, one to an AC network, and a second outlet via an output-rectification diode system to an external DC load.

3. A machine as claimed in claim 2, wherein the output-rectification system is accommodated in the stator of the alternator.

4. A machine as claimed in claim 3, wherein the alternator is provided with two stator windings so as to supply different voltages to the AC outlet and the output-rectification system.

5. A machine as claimed in claim 1, which includes an automatic brush-lifting mechanism which lifts the brushes of the commutator when a starting operation has been completed.

6. A machine as claimed in claim 1, wherein said rectifier system is accommodated in the rotor of the alternator.

7. An electric machine as claimed in claim 1, wherein said generator-field winding is connected to shunt said second commutation system so as to be energized by DC generated by the motor generator.